May 18, 1937.  C. F. DAUSMANN  2,081,126
COMBINED MOTIVE FLUID CONTROL AND BRAKE OPERATING MEANS FOR MOTOR VEHICLES
Filed Feb. 7, 1936   3 Sheets-Sheet 2
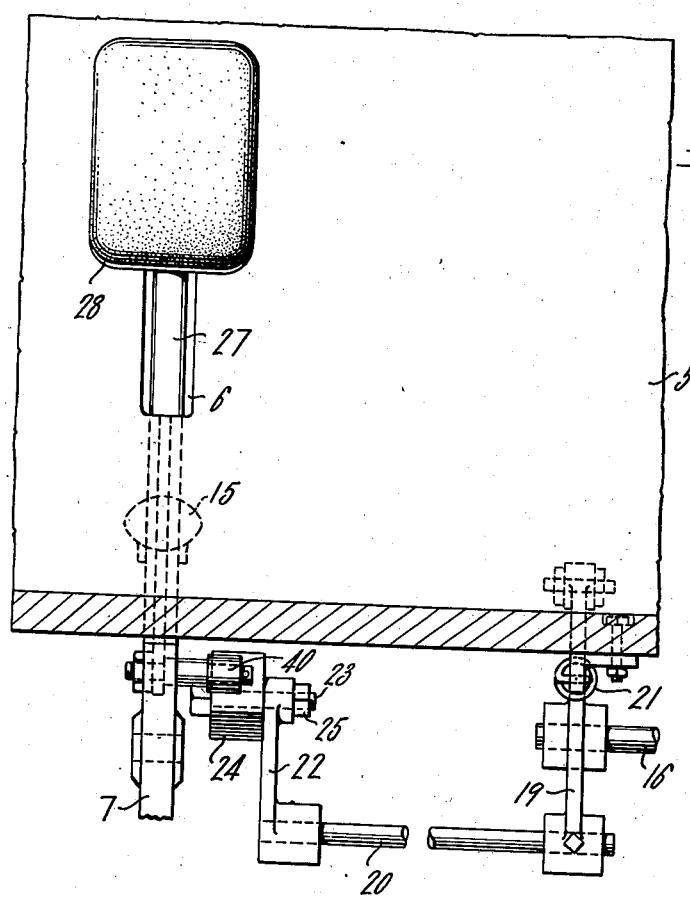
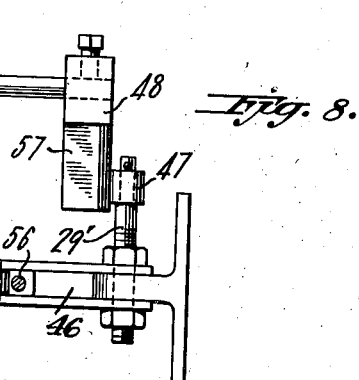
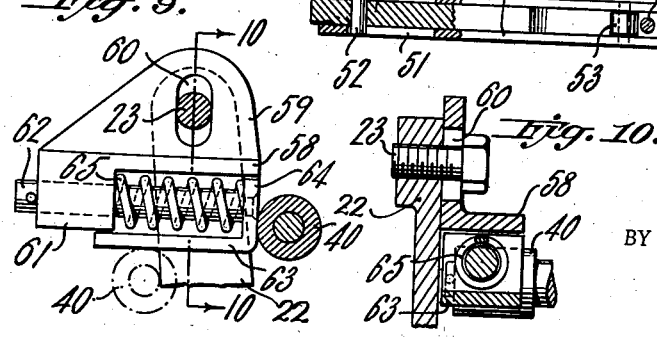
INVENTOR.
CHARLES F. DAUSMANN
BY M. C. Giddane
ATTORNEY.

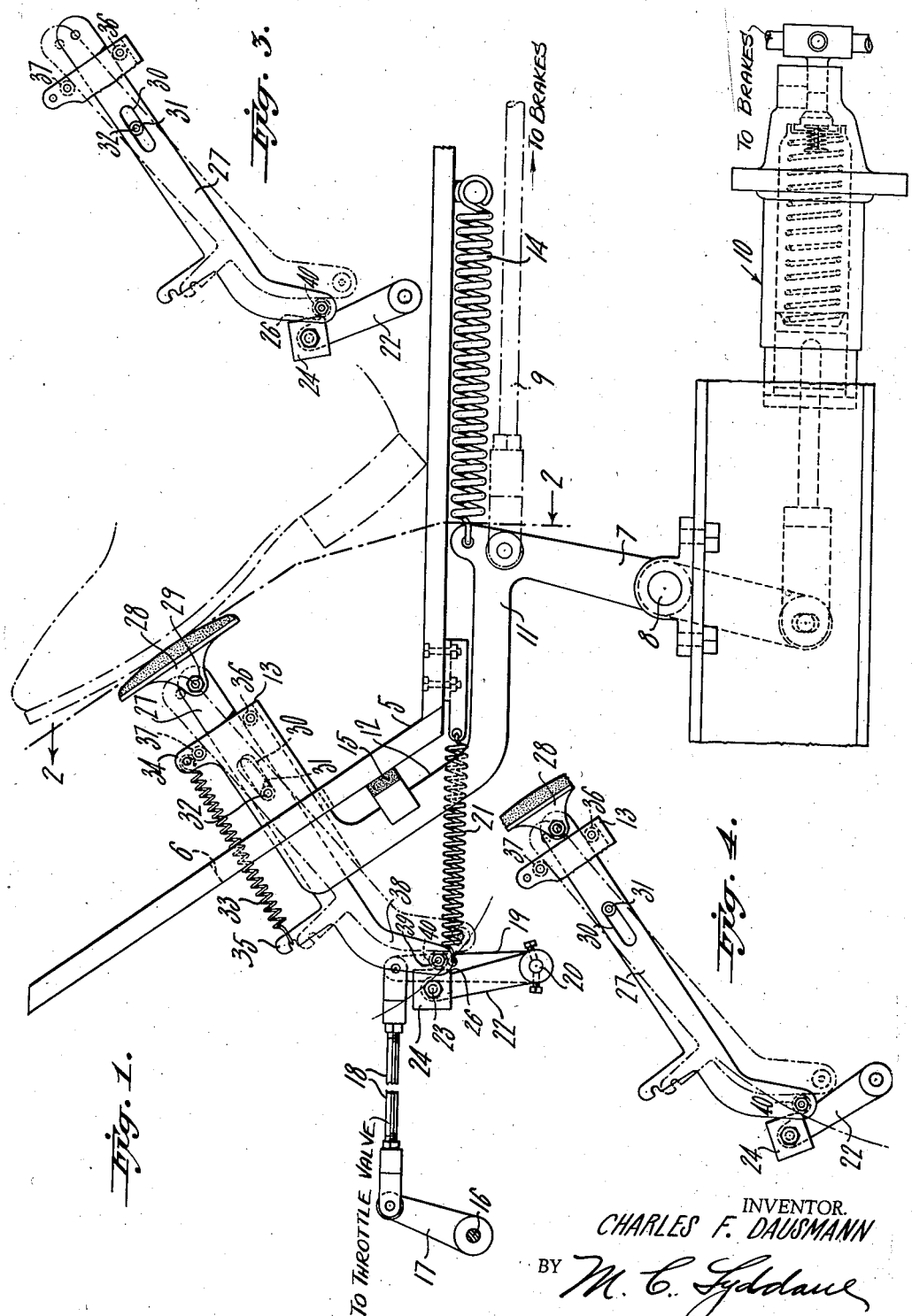

May 18, 1937.                C. F. DAUSMANN                2,081,126
COMBINED MOTIVE FLUID CONTROL AND BRAKE OPERATING MEANS FOR MOTOR VEHICLES
                        Filed Feb. 7, 1936              3 Sheets-Sheet 3
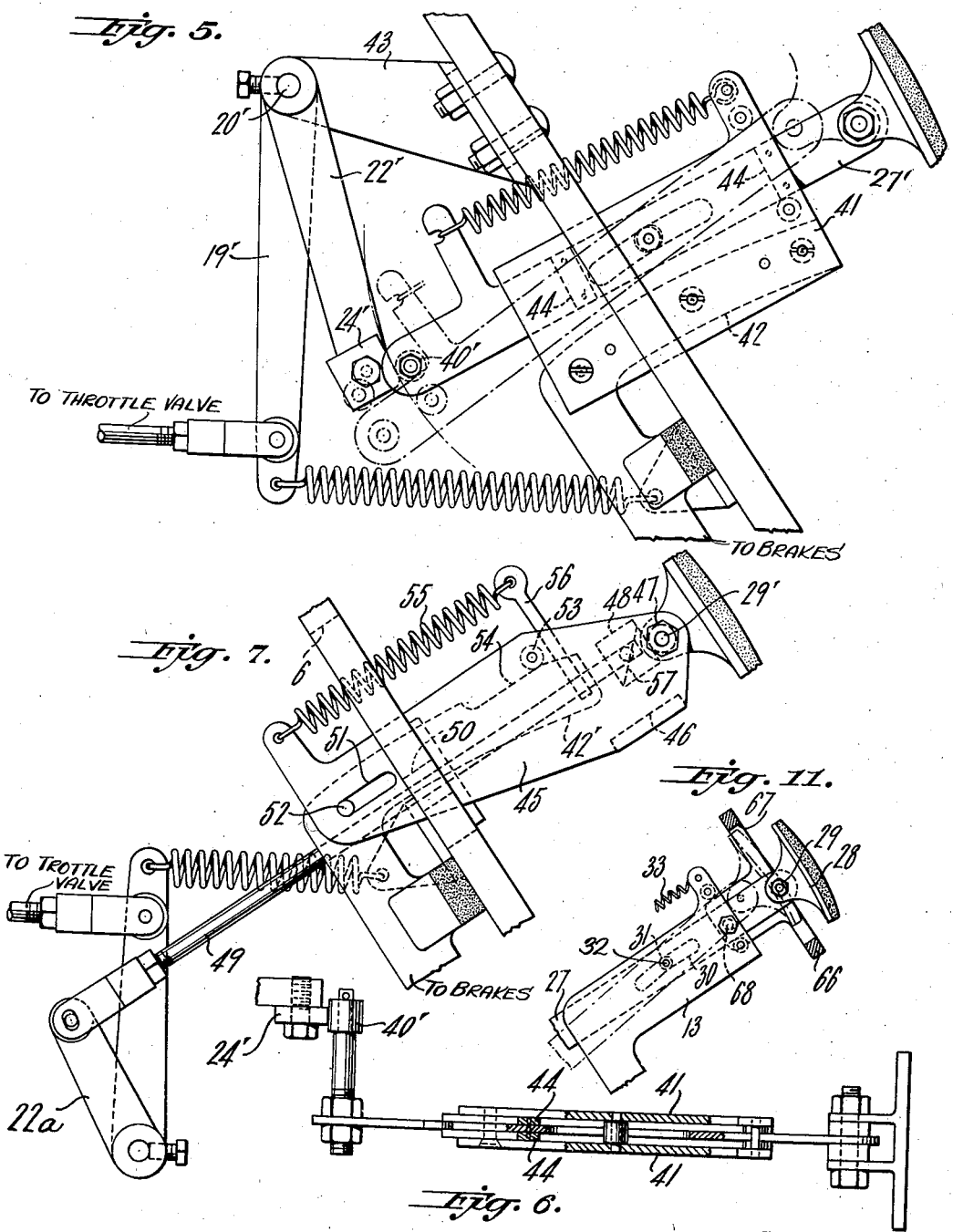
INVENTOR.
CHARLES F. DAUSMANN
BY *M. C. Lyddane*
ATTORNEY.

Patented May 18, 1937

2,081,126

UNITED STATES PATENT OFFICE 2,081,126

COMBINED MOTIVE FLUID CONTROL AND BRAKE OPERATING MEANS FOR MOTOR VEHICLES

Charles F. Dausmann, Hempstead, N. Y., assignor of one-third to Harry A. Bloomberg, New York, N. Y.

Application February 7, 1936, Serial No. 62,737

30 Claims. (Cl. 192—3)

This invention relates to a combined motive fluid control and brake operating means for motor vehicles, and has for its principal object to enable the operator to instantaneously apply the wheel brakes at any driving speed, without removing the foot from the accelerator pedal.

Another object of the invention is to provide a motive fluid control means, a manually operable member, and an element carried by a part of said control means, adjustable thereon, and with respect to said member, whereby the maximum permissible driving speed may be varied as desired.

A further object is to provide a novel mounting and arrangement of the accelerator push-bar with respect to the brake applying lever, and the motive fluid control means, whereby said push-bar, at the maximum or any intermediate speed may be operated without removal of the foot from the accelerator pedal, to permit said control means to be restored to normal position and actuate said lever to apply the brakes.

An additional object of the invention resides in the provision of combined motive fluid control and brake operating means which consists of comparatively few mechanical elements of simple form, readily adaptable to either hydraulically or mechanically operated brakes of the several types now used on motor vehicles, and which in the event of imminent danger of accident or collision, may be operated to quickly bring the vehicle to a stop and eliminate the lapse of time in applying the brakes, incident to the transference of the operator's foot from the accelerator pedal to the brake pedal.

With the above and other objects in view, the invention consists in the improved motive fluid control and brake operating means for motor vehicles, and in the form, construction and relative arrangement of its several parts, as will be hereinafter more fully described, illustrated in the accompanying drawings, and subsequently incorporated in the subjoined claims.

In the drawings wherein I have illustrated several simple and practical embodiments of my invention, and in which similar reference characters designate corresponding parts throughout the several views:

Figure 1 is a side elevation of a combined motive fluid control and brake operating means, illustrating one embodiment of the invention, with the several parts in normal position and showing the accelerator push-bar in broken lines in position for transmitting movement to the brake operating lever.

Fig. 2 is a vertical sectional view substantially on the line 2—2 of Fig. 1.

Fig. 3 is a detail elevation showing an intermediate position of the accelerator push-bar in operative engagement with the motive fluid control means in full lines and in its brake applying position in broken lines.

Fig. 4 is a similar view showing the accelerator push-bar in its fully operated position for maximum acceleration.

Fig. 5 is a view similar to Fig. 1 illustrating another embodiment of my invention and showing the same applied to another mounting or arrangement of the motive fluid control means.

Fig. 6 is a plan view of certain of the parts shown in Fig. 5, partly in section.

Fig. 7 is a side elevation similar to Fig. 5 illustrating a further alternative embodiment of the invention.

Fig. 8 is a plan view of the latter construction with certain parts shown in section.

Fig. 9 is a detailed view illustrating a movement of one feature of the invention.

Fig. 10 is a sectional view taken on the line 10—10 of Fig. 9.

Fig. 11 is a fragmentary elevation partly in section, showing another modification.

Referring in detail to the drawings and more particularly to Figs. 1 to 4 thereof, 5 designates the floor board of a motor vehicle which includes the usual forwardly and upwardly inclined portion, having an opening therein indicated at 6. Beneath the floor board, the brake control lever 7 is fulcrumed, as indicated at 8 upon the frame or chassis of the vehicle. In the operation of this lever, the brakes are applied either through the medium of the mechanical connection shown at 9 or hydraulically, in which latter case the control means for the hydraulical fluid, generally indicated at 10, is operably connected to the lower end of the lever 7. At its upper end the lever 7 is formed with a forwardly extending arm 11 having a part 12 extending upwardly beneath the inclined section of the floor board 5 and provided at its end with a bifurcated or slotted guide 13 which projects upwardly and through the opening 6 in the floor board. The brake applying lever 7 is held in its normal position by a strong coiled spring 14, movement of said lever being limited by an abutment member 15 of rubber, heavy felt or other material carried by the part 12 of said lever and contacting with the front face of the floor board 5.

In the illustrated embodiments of my invention, I have shown several more or less conventional devices for operating the feed valve controlling the supply of gas or other motive fluid to the engine or power plant of the vehicle. Thus in Fig. 1, 16 indicates the shaft connected with the throttle valve of the carburetor upon which the upwardly extending arm 17 is fixed. This arm is operably connected by the rod 18 to the upper end of a similar arm 19 fixed to the rock shaft 20 journalled in suitable bearings adjacent to the floor board 5 of the vehicle. The coil spring 21, connected to the arm 19 yieldingly resists movement of said arm and retains the carburetor throttle in a normal closed position.

Upon the rock shaft 20 a second relatively short, upwardly extending arm 22 is fixed. Upon a stud 23 on the upper end of this arm a rectangular speed regulating member 24 is mounted and fixed in its adjusted position by the locking nut or other suitable means indicated at 25. One of the corners of this rectangular member is rounded or convex as shown at 26 for a purpose which will be hereinafter explained.

In the slotted guide 13 on the upper end of the brake lever 7 the accelerator push-bar 27 is slideably supported. To the upper end of this push-bar the foot pedal 28 is rigidly fixed by the nut 29. The bar 27 is provided with a longitudinal slot 30 receiving an anti-friction roller 31 on a transverse pin 32 fixed in the spaced side walls of the guide 13. This roller limits the movement of the accelerator push-bar 27 in each direction. This bar and the foot pedal 28 are yieldingly held in a normal position by means of the coil spring, 33 attached at one of its ends between the spaced ears 34 on the upper end of the guide 13, and having its other end attached to an upwardly projecting arm 35 formed on the push-bar 27. It will be noted that this spring has its lower end which is connected to the arm 35 spaced from the axial center line of the push-bar 27 to a greater extent than the other end of said spring which is connected to the ears 34 so that said spring extends downwardly from the ears 34 in divergent relation to said push-bar and thus has a tendency to rock said push-bar about the roller 31 and resists casual or unintentional rocking movement of said push-bar relative to the guide 13 from its normal position in which the lower edge of said push-bar rides upon the anti-friction roller 36 which is mounted below said push-bar in the upper end of the guide 13. Opposite to this roller 36 and above the push-bar 27 a second anti-friction roller 37 is mounted between the ears 34 and limits the rocking movement of the upper end of said push-bar about the guide roller 31.

The push-bar 27 extends forwardly from the lower end of the guide 13 and has an angular downwardly projecting end 38. Upon the stud 39 fixed in the end 38 of the push-bar a roller 40 is mounted and has rolling bearing contact against one edge face of the member 24. Normally the axis of the roller 40 is below a horizontal plane passing through the axis of the stud 23 on which the member 24 is mounted. The leverage of the connections with the carburetor throttle valve is such that in a comparatively slight movement of the member 24 and arm 22 under pressure of the roller 40, there occurs a relatively extensive adjustment of the throttle valve to control the supply of gas or other motive fluid to the vehicle engine.

In the operation of the mechanism above described, as shown in Fig. 1, the operator presses downward with his foot on the pedal 28 thus transmitting a direct downward thrust to the accelerator push-bar 27 and expanding the spring 33. As in the present operation of motor vehicles, such pressure upon the accelerator push-bar through the connections with the carburetor throttle controls the feed or supply of the gas to the engine cylinders. Thus as seen in Fig. 3 of the drawings the push-bar 27 is at an intermediate point of its downward movement in which the roller 40 coacting with member 24 has actuated the arm 22 and through the connections with the rock shaft 20 the carburetor throttle is adjusted to the position required for supplying the gas in the necessary volume to effect the movement of the vehicle at a desired speed. In such movement of arm 22 the angular relation between the edge face of the member 24 in contact with roller 40 and the periphery of said roller is changed, as will be evident from a comparison of Figures 1, 3 and 4, and the roller 40 has moved to a point closely adjacent to the rounded corner 26 of the member 24. As the downward movement of the push-bar 27 is continued, the roller 40 finally rides over the rounded corner 26 of said member and the push-bar 27 at the upper end of the slot 30 therein comes into bearing contact with the roller 31 so that the thrust on the push-bar 27 is transmitted to the brake applying lever 7. This lever moving on an arc from its fulcrum 8, results in the continued downward movement of the roller 40 while the spring 21 returns the carburetor valve actuating means to normal position. Therefore, without removing the foot from the accelerator pedal 28 or interrupting the downward pressure thereof, lever 7 is then actuated against the resistance of the spring 14 to effect the instantaneous application of the brakes. The maximum driving speed at which such application will occur is varied by angularly adjusting the member 24 on the end of the arm 22 so that a greater or less length of travel of the roller 40 on the edge face of said member will occur before the roller rides around the convex corner 26 of said member.

When it is desired to apply the brakes at any intermediate driving speed to avoid an accident or collision, it is only necessary for the operator, without removing his foot from the pedal 28, to thrust the foot in a forward direction. The push-bar 27 is thus rocked about the guide roller 31 against the yielding resistance of the spring 33 and moves to the position indicated in broken lines in Figs. 1, 3 and 4 of the drawings. The roller 40 on the forward end of the push-bar is thus moved rearwardly and out of bearing contact with the member 24 so that spring 21 immediately contracts to return the carburetor throttle actuating means to normal position. At the same time the downward pressure of the pedal 28 is continued, push-bar 27 riding against anti-friction roller 37 until the pedal which is connected to the push-bar contacts with the upper end of the guide 13, whereupon in the continued pressure on pedal 28, the lever 7 is operated and the brakes applied as before described.

It will be evident from the above description that by the provision of a common operating pedal for both the accelerator push-bar and the brake applying lever, the loss of time in applying the brakes, incident to the transference of the foot from the accelerator pedal to the brake pedal, is eliminated. Since it has been estimated that after the mental reaction occurs and such transference of the foot is made to the brake pedal, there is a lapse of ¾ of a second and that in this time, at a driving speed of 30 miles per hour, the car will move 30 feet, it will be appreciated that in many cases the elimination of this loss of time in the application of the brakes may mean the saving of the driver or the pedestrian from loss of life or serious injury. Also drivers of motor vehicles in cases of sudden emergency have become excited to such an extent as to be incapable of properly reacting to the situation so that they continue to press upon the accelerator push-bar and thus increase the speed of the vehicle instead of applying the brakes to bring the vehicle to a stop. With my present invention, this occurrence is impossible, since the continued application of pressure on the accelerator foot pedal, whether or not said pedal is consciously actuated to rock the push-bar around the guide roller 31, will automatically result in discontinuing the further supply of motive fluid to the engine and the application of the vehicle brakes.

In Fig. 5, I have shown a slightly modified form of my invention applied to another arrangement of the motive fluid control means. In this case plates 41 are secured to opposite sides of the rearwardly projecting upper end 42 of the brake lever. The accelerator push-bar 27' is mounted between these plates 41 as previously described.

In this case the rock shaft 20' is mounted in a bracket 43, secured to the floor board 5 above the accelerator push-bar. The arm 19' fixed to one end of said shaft, extends downwardly therefrom and is connected at its lower end with the carburetor throttle. Arm 22' extends downwardly from the other end of the rock shaft and upon its lower end the adjustable member 24' is mounted as above described for engagement by roller 40' carried by the lower end of the accelerator push-bar. Spacer plates 44 are secured to opposite sides of the push-bar to centrally position said bar between the guide plates 41.

This construction operates in substantially the same manner as that shown in Fig. 1.

In Figs. 7 and 8, I have illustrated another alternative embodiment of the invention in which the accelerator push-bar comprises parallel plates 45 connected near their upper ends by a transverse web 46. The bolt 29' which secures the foot pedal to the plates 45 has a roller 47 on one end thereof to engage an arm 48 secured upon the upper end of a thrust rod 49. This rod moves through a guide bushing 50 mounted in an opening in the floor board and has its lower end connected to the arm 22a of the actuating means for the carburetor throttle which is of the same type as that shown in Fig. 1.

The arm 42' of the brake lever extends upwardly between the spaced plates 45, said plates at their lower ends being slotted as at 51 to receive the opposite ends of a transverse pin 52 fixed in the lever arm. An anti-friction roller 53 mounted between the plates 45 rides upon the upper edge 54 of the arm 42'. A spring 55 connected to the lower end of one of the plates 45 and to a pin 56 fixed in the upper end of the arm 42, yieldingly holds the plates 45 in the normal position shown in Fig. 7.

The arm 48 is provided with an obliquely inclined cam face 57 which directs the roller 47 to its normal position on said arm as will appear from the following description.

In the operation of this form of my invention, pressure on the foot pedal moves the plates 45 downwardly on the arm 42' against the resistance of spring 55. Thus roller 47 bearing against the upper side of arm 48 transmits thrust to the rod 49 whereby the carburetor throttle actuating means is operated to control the supply of gas to the engine cylinders. Maximum acceleration is limited by contact of the upper ends of the slots 51 with the pin 52. Further downward pressure on the pedal causes the plates 45 to pivot about the pin 52, thereby displacing the roller from the arm 48 and permitting the carburetor throttle actuating means to return to normal position, while the brake lever is operated to apply the brakes. At any intermediate driving speed the same result may be obtained by shifting the foot forwardly while maintaining downward pressure upon the pedal.

When pressure on the pedal is released the brake lever returns to normal position and spring 55 moves the plates 45 upwardly on the lever arm 42'. The roller 47 will thus ride over the cam face 57, rocking the plates 45 about the pin 52 and causing said roller to assume its normal position, under the action of spring 55, in bearing engagement with the upper side of arm 48.

Each of the above described embodiments of my invention is comparatively simple in its construction as well as positive and reliable in operation. By eliminating the usual brake pedal and actuating both the motive fluid control means and the brake applying lever from a single foot pedal the application of the brakes is practically instantaneous upon the discontinuance of the manual operation of said control means. Thus, the vehicle can be brought to a complete stop in less time than is possible with standard equipment.

In Figs. 9 and 10, I have illustrated an adjustable speed pre-determining member having a safety feature which I believe to be preferable to the member 24 heretofore described. Thus a bracket member 58 has a flange 59 provided with an elongated slot 60 to receive the stud 23 on the arm 22. This bracket at one end is provided with a guide bearing 61 for a rod 62. An angular member 63, at one end, has sliding contact with the bearing 61. To the other angularly disposed end 64 of this member one end of the rod 62 is fixed. A spring 65 surrounds the rod 60 between the bearing 61 and end 64 of member 63. This spring is of greater strength than the spring 21 which returns the carburetor throttle control means to normal position. Thus in the usual operation of the device the member 63 will move as a unit with the bracket 58 and arm 22. In the event, however, that the carburetor throttle control means should fail to operate properly, the member 63 will then be moved against the resistance of spring 65 relative to the bracket 58, by the pressure of the roller 40 on the accelerator push-bar so that said roller may move out of contact with the end 64 of said member. Thereupon, the lever 7 is operated and the brakes applied in the manner above described. The normal position of the end 64 of member 63 with respect to the roller 40 is varied by adjusting the bracket 58 radially and circumferentially of the stud 23 whereby maximum speed acceleration may be predetermined.

In Fig. 11, I show a slight modification, in which the upper end of the brake lever is provided with a foot pedal 66 of comparatively large dimensions having a rectangular opening 67 therein to receive the accelerator pedal 28. The foot pedal 66 is adjustably swiveled, by means of bolt 68, to the upper end of the brake lever and may be adjusted to any suitable angle corresponding to the angle of the accelerator pedal 28. This device operates in the same manner as heretofore described, the downward pressure on foot pedal 28 being translated through roller 31 and pin 32 into a rocking movement of the brake lever 7. The pedal 66 provides a more extensive supporting surface for the foot in the continued downward thrust to apply the brakes, and may for this reason be found desirable.

From the foregoing description, in connection with the accompanying drawings, the construction, manner of operation and several advantages of the described embodiments of my invention will be clearly understood. The device affords a simple and inexpensive means whereby motor vehicles may be operated with greater safety to the occupants and pedestrians. Also the invention provides means whereby the adjustable member 24 may be locked in its set or adjusted position so that the driver cannot operate the vehicle beyond a predetermined maximum speed. In the event that an emergency should arise, and the operator should thrust directly downward on the accelerator push-bar, thereby actuating the carburetor control means to the position for maximum acceleration, before a large quantity of gas can enter the intake manifold of the engine and appreciably increase the speed of movement of the vehicle, said carburetor control means is returned to normal position and the vehicle brakes applied to bring the vehicle to a complete stop.

In the above description I have made reference to several simple and practical embodiments of the invention. It is nevertheless to be understood that the essential features thereof might also be incorporated in various other alternative structural forms. Accordingly, the privilege is reserved of embodying the novel features of my present disclosure in other constructions which might be found best adapted to various types of motor vehicles, and of resorting to all such legitimate changes in the form, construction and relative arrangement of the various parts as may be fairly comprehended within the spirit and scope of the invention as claimed.

I claim:

1. In combination with motive fluid control means and a brake applying member for motor vehicles, an accelerator push-bar and means operatively controlled by said push-bar, for translating movements of said push-bar to said control means, said push-bar and brake applying member having coacting means, rendered effective upon an operation of said push-bar in speed accelerating direction which renders said translating means ineffective, to actuate said member and apply the vehicle brakes.

2. In combination with motive fluid control means and a brake applying member for motor vehicles, a foot operated accelerator having a pedal, and means rendered effective in a continuous depression of said accelerator pedal to actuate said motive fluid control means or the brake applying member at the option of the operator, without removing the foot from said pedal.

3. In combination with the brake applying lever of a motor vehicle, accelerator means including a push-bar and foot pedal, mounted upon said lever and movable relative thereto, and said push-bar and lever having coacting means, rendered effective at the option of the operator in the depression of said push-bar, to actuate said lever and apply the vehicle brakes.

4. In combination with motive fluid control means and a brake applying member for motor vehicles, a single manually operable actuator for said control means having a foot pedal, and coacting means on said actuator and brake applying member, rendered effective by manipulations of said foot pedal to disestablish the cooperative relation between said actuator and control means and actuate said member to apply the vehicle brakes, at the maximum or any intermediate driving speed, at the will of the operator.

5. In combination with motive fluid control means and a brake applying member for motor vehicles, a pedal-operated push-bar movable with and relative to said brake applying member, said push-bar and control means having coacting parts, operable in the movement of said bar in one direction with respect to the brake applying member to control speed acceleration of the vehicle, such coacting relation of said parts being automatically disestablished at maximum speed acceleration, and coacting means on the push-bar and brake applying member thereupon rendered effective, without removing the foot from the pedal, to actuate said member and apply the vehicle brakes.

6. In combination with motive fluid control means and a brake applying member, for motor vehicles, a pedal operated push-bar movable with and relative to said brake applying member, said push-bar and control means having coacting parts, operable in the movement of said bar in one direction with respect to the brake applying member to control speed acceleration of the vehicle, said push-bar being also movable on said member at an angle to said first direction, such coacting relation of said parts being disestablished by the latter movement of the push-bar and at maximum speed acceleration, and coacting means on the push-bar and brake applying member, rendered effective in either such event, by continued depression of the foot pedal, to actuate said member and apply the brakes.

7. In combination with motive fluid control means, and a brake applying member for motor vehicles, a pedal operated push-bar mounted on said member for rectilinear and pivotal movement relative thereto, means carried by said push-bar cooperating with a part of said control means in the rectilinear movement of said bar to variably supply motive fluid to the vehicle motor, said push-bar being pivotally moved by manipulation of the foot pedal to permit restoration of the control means to normal position, and means thereafter rendered operable by continued rectilinear movement of the push-bar to actuate said member and apply the vehicle brakes.

8. In combination with motive fluid control means and a brake applying member, for motor vehicles, a pedal-operated push-bar mounted on said member for rectilinear and pivotal movement relative thereto, means carried by said push-bar cooperating with a part of said control means in the rectilinear movement of said bar to variably supply motive fluid to the vehicle motor, said push-bar being pivotally moved by manipulation of the foot pedal to permit restoration of the control means to normal position, means thereafter rendered operable by continued rectilinear movement of the push-bar to actuate said member and apply the vehicle brakes, and means yieldingly resisting such pivotal movement of the push-bar.

9. In combination with motive fluid control means and a brake applying member for motor vehicles, a pedal-operated push-bar mounted on said member for rectilinear and pivotal movement relative thereto, means carried by said push-bar cooperating with a part of said control means in the rectilinear movement of said bar to variably supply motive fluid to the vehicle motor, said push-bar being pivotally moved by manipulation of the foot pedal to permit restoration of the control means to normal position, means thereafter rendered operable by continued rectilinear movement of the push-bar to actuate said member and apply the vehicle brakes, and a single spring acting to yieldingly resist such pivotal movement of the push-bar and to return said bar to normal position with respect to the brake applying member.

10. In combination with the brake lever of a motor vehicle, accelerator means including a pedal operated push-bar, means supporting said push-bar for manipulation by the foot pedal whereby said accelerator means may be rendered ineffective at will without releasing pressure on the foot pedal, and said supporting means including a member fixed to the brake lever for translating further depression of the foot pedal into a brake applying movement of said lever, after said accelerator means is rendered ineffective.

11. In combination with the brake lever of a motor vehicle, accelerator means including a pedal operated push-bar, means for mounting said push-bar on the brake lever for movement relative thereto, to and from position to effectively actuate said accelerator means, said push-bar and mounting therefor, when the accelerator means is ineffective, translating further depression of the foot pedal into a brake applying movement of said lever.

12. In combination with the brake lever of a motor vehicle, accelerator means including a pedal operated push-bar, guide means on the upper end of said brake lever supporting the push-bar for movement in a direction to actuate the accelerator means, said bar being movable on the guide means in a second direction by manipulation of the foot pedal, to a position to render said push-bar ineffective to actuate the accelerator means, and means acting in the further manipulation of the foot pedal, when the push-bar is in the latter position, to operate said lever and apply the vehicle brakes.

13. In combination with motive fluid control means for motor vehicles, including a rock shaft and an arm fixed thereto, an accelerator push-bar, and coacting parts on said arm and push-bar movable relative to each other in the depression of said push-bar to actuate said control means, and out of coacting engagement with each other to limit maximum acceleration.

14. In combination with motive fluid control means for motor vehicles, including a rock shaft and an arm fixed thereto, an accelerator push-bar, coacting parts on said arm and push-bar movable relative to each other in the depression of said push-bar to actuate said control means, and out of coacting engagement with each other to limit maximum acceleration, and means for adjusting one of said parts relative to the other to variably regulate the maximum limit of acceleration.

15. In combination with motive fluid control means for motor vehicles, including a rock shaft and an arm fixed thereto, an accelerator push-bar, coacting parts on said arm and push-bar movable relative to each other in the depression of said push-bar to actuate said control means, one of said parts comprising a roller and the other part having a flat surface to contact with said roller, said roller moving off said surface at maximum speed acceleration, and means for adjusting the latter part to vary the angular relation between said flat surface and the path of movement of the push-bar and thereby variably predetermine the maximum speed acceleration.

16. In combination with motive fluid control means for motor vehicles, including a rock shaft and an arm fixed thereto, an accelerator push-bar, coacting parts carried by and movable with said arm and push-bar respectively to actuate said control means when the push-bar is depressed, said parts moving out of engagement with each other at maximum speed acceleration, and means for yieldably mounting one of said parts to permit movement thereof relative to the member by which it is carried, in response to pressure thereon by the other of said parts, in the event of abnormal resistance to the actuation of said control means.

17. In combination with motive fluid control means for motor vehicles, including a rock shaft and an arm fixed thereto, an accelerator push-bar, a roller carried by said push-bar, a coacting member carried by said arm and having a flat surface with which said roller has rolling contact in the depression of said push-bar to actuate said control means, movement of said roller off said surface limiting maximum speed acceleration, means for adjustably mounting said member on said arm to position said surface at a desired angle to the line of thrust of said roller, and means permitting of a yielding bodily movement of said member relative to the arm, in response to pressure of the roller thereon, in the event of abnormal resistance to the actuation of said control means.

18. In combination with motive fluid supply means and a power control member for motor vehicles, a single rectilinearly movable actuator having spaced parts optionally rendered effective by the vehicle operator in a continuous movement of said actuator to selectively actuate said fluid supply means or the power control member.

19. In combination with motive fluid supply means and a power control member for motor vehicles, an actuator mounted upon said member for rectilinear movement relative thereto, and means rendered effective at the option of the vehicle operator in a single actuation of said actuator to selectively cause the latter to actuate said fluid supply means or the power control member.

20. In combination with motive fluid supply means and a power control member for motor vehicles, a single actuator mounted upon said member for movement relative thereto, by the vehicle operator, said actuator having means movable into and out of actuating engagement with a part of said fluid supply means, whereby the latter is actuated in one position of said actuator upon operative movement of the latter relative to the control member, and means, operative when said actuator is moved to another position relative to the control member, to transmit movement to the latter in the operation of said actuator.

21. In combination with motive fluid control means and a power control member for motor vehicles, a pedal operated push-bar mounted on said member for pivotal movement relative to the latter, depression of said push-bar transmitting an operative movement to said control member, and means carried by said push-bar and positioned by a pivotal movement of said push-bar on the control member into or out of coacting relation with a part of said motive fluid control means.

22. In combination with motive fluid control means and a power control member for motor vehicles, a pedal operated push-bar mounted on said member for rectilinear and pivotal movement relative thereto, means carried by said push-bar and positioned by the pivotal movement of said push-bar into or out of coacting relation with a part of said control means, and means, effective when such coacting relation is disestablished, to transmit an operative movement to said power control member in the depression of the push-bar.

23. In combination with motive fluid control means for motor vehicles, including a movable part, an accelerator push-bar, and coacting means on said part and the push-bar movable relative to each other in the actuation of said control means by the depression of the push-bar, and out of such coacting engagement with each other in the continued movement of said push-bar, to limit maximum acceleration.

24. In combination with motive fluid control means for motor vehicles, including a movable part, an actuator, and relatively adjustable coacting elements on said part and the actuator for varying the extent of operation of said motive fluid control means and the maximum limit of speed acceleration in the operation of said actuator.

25. In combination with motive fluid control means, and a power control member for motor vehicles, a common actuator for said control means and power control member, pivotally mounted upon the latter, means yieldingly holding said actuator in a normal position and in cooperative relation with the fluid control means whereby the latter is actuated upon operation of said actuator, and said actuator being pivotally movable by the vehicle operator out of cooperating relation with the fluid control means, and operable in the latter position thereof to independently actuate said power control member.

26. In combination with motive fluid control means and a power control member for motor vehicles, said fluid control means including a movable element, a common actuator for said fluid control means and power control member pivotally mounted upon the latter, coacting parts carried by said movable element and the actuator, one of said parts being yieldable relative to the other in the event of abnormal resistance to the actuation of said fluid control means, and said actuator being pivotally movable by the vehicle operator, to dispose the part carried thereby out of coacting engagement with the part carried by said element of the fluid control means, whereby said power control member may be independently actuated in the operation of said actuator.

27. In combination with motive fluid supply means and a power control member for motor vehicles, means for actuating said power control member including a manually operable element, means carried by said element for actuating said motive fluid supply means, and means for mounting said element whereby the same may be rendered effective in a single operation thereof to selectively actuate said power control member or the motive fluid supply means.

28. In combination with motive fluid supply means and a power control member for motor vehicles, actuating means for said fluid supply means and power control member, including spaced mean to coact respectively with a part of the fluid supply means and the power control member, and a common operator-controlled actuator for said spaced means, operable in a single actuation thereof to independently actuate the power control member or the fluid supply means at the option of the operator.

29. In combination with motive fluid supply means and a power control member for motor vehicles, an actuator for said power control member movably mounted thereon, and means carried by said actuator movable therewith into and out of cooperative relation with a part of the motive fluid supply means to actuate the latter independently of said power control member.

30. In combination with motive fluid supply means and a power control member for motor vehicles, an actuator for said member pivotally movable thereon, and means carried by said actuator, positioned by the pivotal movement of the latter into and out of cooperative relation with a part of motive fluid supply means, whereby said means or the power control member may be selectively and independently actuated.

CHARLES F. DAUSMANN.